US012694043B2

(12) United States Patent
Zeng et al.

(10) Patent No.: US 12,694,043 B2
(45) Date of Patent: Jul. 28, 2026

(54) SYSTEM FOR MANUFACTURING AND PROVISIONING AN INFORMATION HANDLING SYSTEM

(71) Applicant: Dell Products L.P., Round Rock, TX (US)

(72) Inventors: Wen-Hao Zeng, Round Rock, TX (US); Nikhil M. Vichare, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 321 days.

(21) Appl. No.: 18/138,268

(22) Filed: Apr. 24, 2023

(65) Prior Publication Data

US 2024/0354316 A1    Oct. 24, 2024

(51) Int. Cl.
    *G06F 16/00*        (2019.01)
    *G06F 16/242*       (2019.01)
    *G06F 16/28*        (2019.01)

(52) U.S. Cl.
    CPC ........ *G06F 16/288* (2019.01); *G06F 16/2448* (2019.01)

(58) Field of Classification Search
    CPC ........................... G06F 16/288; G06F 16/2448
    USPC ........................................................ 707/736
    See application file for complete search history.

(56) References Cited

U.S. PATENT DOCUMENTS

| | | | | |
|---|---|---|---|---|
| 11,647,091 B2 * | 5/2023 | Rogynskyy | .......... | G06Q 10/107 |
| | | | | 707/736 |
| 11,681,700 B1 * | 6/2023 | Li | .......... | G06F 16/319 |
| | | | | 707/742 |
| 11,762,907 B2 * | 9/2023 | Rajagopalan | ..... | G06F 16/90335 |
| | | | | 707/736 |
| 12,033,416 B2 * | 7/2024 | Ponce Suarez | ..... | G06F 18/2178 |
| 2010/0153377 A1 * | 6/2010 | Rajan | ................ | G06F 16/24575 |
| | | | | 707/723 |
| 2022/0122008 A1 * | 4/2022 | Mowatt | .................... | G06F 8/77 |
| 2022/0138225 A1 * | 5/2022 | Manevich | ............... | G06F 16/23 |
| | | | | 707/736 |

OTHER PUBLICATIONS sciencedirect.com, Persona Description, https://www.sciencedirect.com/topics/computer-science/persona-description, downloaded from the Internet, Dec. 2024.

* cited by examiner

*Primary Examiner* — Alexandria Y Bromell
(74) *Attorney, Agent, or Firm* — Terrile, Cannatti & Chambers, LLP; Stephen A. Terrile

(57)        ABSTRACT

A system, method, and computer-readable medium for performing an information technology system monitoring and management operation. The information technology system monitoring and management operation includes: identifying IT asset data from a plurality IT asset data sources contained within an IT environment; extracting information from at least some of the IT asset information, the information being extracted via a named entity recognition model; analyzing the information extracted from the at least some of the IT asset information; and, provisioning an IT asset for the new user based upon the analyzing.

14 Claims, 5 Drawing Sheets

| Recommended System | Standard Notebook | Travel Notebook | Premium Travel Notebook | Executive Notebook | Engineering Workstation | Mobile Workstation | Standard Desktop | Engineering Desktop |
|---|---|---|---|---|---|---|---|---|
| Persona | Business Professional | Business Professional Mobile | Outside Sales (Customer Facing) | Executive | Presales, Field Support, Customer Eng. | Graphics Design, CAD Dev., Product Eng., Development | Desk-Based Business Professional | Desk-Based Development & Technical Engineering |

*Figure 4*

| Budget | Hardware Performance | Usage Preference |
|---|---|---|
| Job Family | Software to be executed | Telemetry Insights |
| Job Title | Specific Job Duty | User Personas |

*Figure 5*

Obtain human resource data
610

Analyze job description
620

Identify users with similar roles
630

Select users with similar roles
640

Rank current assets by user experience
650

Associate particular IT asset with new hire
660

Fabricate particular IT asset
670

SYSTEM FOR MANUFACTURING AND PROVISIONING AN INFORMATION HANDLING SYSTEM

BACKGROUND OF THE INVENTION

Field of the Invention

The present invention relates to information handling systems. More specifically, embodiments of the invention relate to manufacturing and provisioning an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing an information technology (IT) system monitoring and management operation, comprising: identifying IT asset data from a plurality IT asset data sources contained within an IT environment; extracting information from at least some of the IT asset information, the information being extracted via a named entity recognition model; analyzing the information extracted from the at least some of the IT asset information; and, provisioning an IT asset for the new user based upon the analyzing.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: identifying IT asset data from a plurality IT asset data sources contained within an IT environment; extracting information from at least some of the IT asset information, the information being extracted via a named entity recognition model; analyzing the information extracted from the at least some of the IT asset information; and, provisioning an IT asset for the new user based upon the analyzing.

In another embodiment the invention relates to a computer-readable storage medium embodying computer program code, the computer program code comprising computer executable instructions configured for: identifying IT asset data from a plurality IT asset data sources contained within an IT environment; extracting information from at least some of the IT asset information, the information being extracted via a named entity recognition model; analyzing the information extracted from the at least some of the IT asset information; and, provisioning an IT asset for the new user based upon the analyzing.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 shows an example array of persona vs recommended system options;

FIG. 5 shows an example array of provisioning aspects considered when performing the IT asset provisioning operation; and, FIG. 6 shows a flowchart of an IT asset provisioning operation.

DETAILED DESCRIPTION

Figure 1:
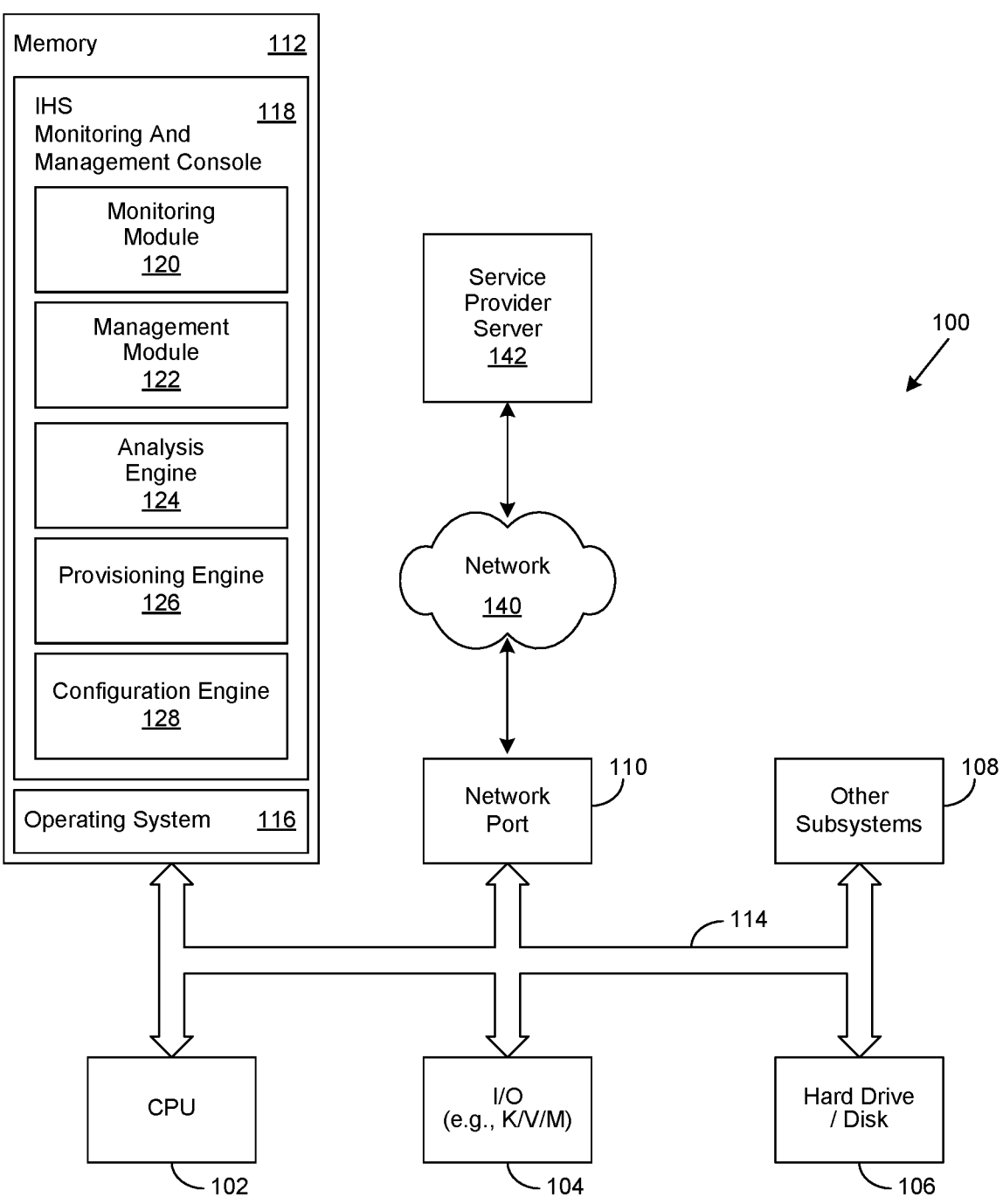
FIG. 1 shows a general illustration of components of an information handling system as implemented in the system and method of the present invention.

Various aspects of the disclosure reflect an appreciation that it can be desirable to provide information technology (IT) as a service offering to certain customers of information technology such as information handling systems.

Various aspects of the disclosure reflect an appreciation that IT as a service can provide end to end IT services that cover every aspect of an IT operation of a customer. Various aspects of the disclosure reflect an appreciation that such end to end IT services can include provisioning new information handling system devices for new hires to the customer organization. Various aspects of the disclosure reflect an appreciation that it can be challenging to provision and configure the right device for a new hire can be challenging. Various aspects of the disclosure reflect an appreciation that because customer organizations can have budget constraints, providing the most powerful device to all users is not a feasible approach.

Various aspects of the disclosure reflect an appreciation that with no prior data available for the new hire, it can be more challenging to predict the needs of the new hire in terms of hardware performance. Various aspects of the disclosure reflect an appreciation that different members of the same team can have different use cases of their device; thus, a one size fits all solution is not feasible. Various aspects of the disclosure reflect an appreciation that when a new device is provided to the new hire, swapping the device for another device can be a lengthy process, especially with organizations which make use of the remote working conditions.

Various aspects of the disclosure likewise reflect an appreciation that it is known to provision new devices using human resources (HR) data such as job function, job family and job title. However, this HR data may not accurately identify the actual role of the end user or their performance needs. Users may have different needs in terms of mobility, battery life and screen quality when compared to other members of the job family. Various aspects of the disclosure likewise reflect an appreciation that over provisioning hurts budget, while under provisioning hinders user experience and performance.

A system, method, and computer-readable medium are disclosed for performing a provisioning operation to identify and configure an appropriate information handling system for individuals within a customer organization. In certain embodiments, the provisioning operation is performed by a provisioning system. In various embodiments, the provisioning system efficiently selects a new device based on information provided from a plurality of sources. Information obtained from the sources is used to determine the most efficient choice of device for the new hire. In various embodiments, the plurality of sources includes a named entity recognition machine learning model which is applied to information associated with the new hire such as job description information and specific job duty information. In various embodiments, the plurality of sources includes insight and persona information associated with the new hire.

In various embodiments, a named entity recognition machine learning model identifies and extracts keywords from a job description information associated with the new hire. In various embodiments, the keywords can include one or more of software needed by the job, tasks related to the job, job title information, job team information and job organization information.

In various embodiments, the plurality of sources includes insight and persona information associated with the new hire can be provided via a hiring manager. In various embodiments, the insight and persona information can be based upon current employees with similar role. In various embodiments, when the current employees are identified, software used by the current employees can be obtained through IT telemetries. Additionally, when the current employees are identified, user personas for the current employees can be used to identify a user persona for the new hire. In various embodiments, the user personas can include battery persona information, performance smart tags, application insights, mobility use, and peripheral device. In various embodiments, this persona information is also available using a telemetry history of the current employees.

In various embodiments, users with telemetry history are ranked by the number of overlapping personas and then by their current user experience. Platforms with similar user persona and good user experience are added as candidate platforms for provisioning.

In various embodiments, user experience is evaluated by user survey (if available), by experience score calculated from telemetries or by a combination thereof. In various embodiments, if a hiring manager is not available, the keywords extracted from named entity recognition models are used to identify which previous job postings have similar keywords. The provisioned platforms for particular job postings are added as candidate platforms. Candidate platforms are determined using a threshold of overlapping keywords, ranking of the number of overlapping keywords or a combination thereof.

Such a provisioning system advantageously uses a named entity recognition model to identify keywords from job descriptions, then use keywords to filter for similar employees and their associated platforms. Such a provisioning system advantageously uses suggested similar employee(s) to identify user personas of the new user, then uses personas to filter for similar employees and their associated platforms.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise an information handling system management and monitoring console 118. In one embodiment, the information handling system 100 is able to download the IT system monitoring and management console 118 from the service provider server 142. In another embodiment, the IT system monitoring and management console 118 is provided as a service from the service provider server 142.

In certain embodiments, the IT system monitoring and management console 118 may include a monitoring module 120, a management module 122, an analysis engine 124, a provisioning engine 126, a configuration engine 128, or a combination thereof. In certain embodiments, the IT system monitoring and management console 118 may be implemented to perform an IT system monitoring and management operation. In certain embodiments, the IT system monitoring and management operation may be performed during operation of an information handling system 100. In various embodiments, performance of the IT system monitoring and management operation may result in the realization of improved provisioning of information handling systems within an IT environment, as described in greater detail herein.

In various embodiments, the provisioning engine 126 performs a provisioning operation to identify and configure an appropriate IT asset for individuals within a customer organization. In various embodiments, the provisioning engine 126 efficiently selects a new device based on information provided from a plurality of sources. Information obtained from the sources is used to determine the most efficient choice of device for the new hire. In various embodiments, the plurality of sources includes a named entity recognition machine learning model which is applied to information associated with the new hire such as job description information and specific job duty information. In various embodiments, the plurality of sources includes insight and persona information associated with the new hire.

In various embodiments, a named entity recognition machine learning model identifies and extracts keywords from a job description information associated with the new hire. In various embodiments, the keywords can include one or more of software needed by the job, tasks related to the job, job title information, job team information and job organization information.

In various embodiments, the plurality of sources includes insight and persona information associated with the new hire can be provided via a hiring manager. In various embodiments, the insight and persona information can be based upon current employees with similar roles. In various embodiments, when the current employees are identified, software used by the current employees can be obtained through IT telemetries. Additionally, when the current employees are identified, user personas for the current employees can be used to identify a user persona for the new hire. In various embodiments, the user personas can include battery persona information, performance smart tags, application insights, mobility use, and peripheral device. In various embodiments, this persona information is also available using a telemetry history of the current employees.

In various embodiments, users with telemetry history are ranked by the number of overlapping personas and then by their current user experience. Platforms with similar user persona and good user experience are added as candidate platforms for provisioning.

In various embodiments, user experience is evaluated by user survey (if available), by experience score calculated from telemetries or by a combination thereof. In various embodiments, if a hiring manager is not available, the keywords extracted from named entity recognition model are used to identify which previous job postings have similar keywords. The provisioned platforms for particular job postings are added as candidate platforms. Candidate platforms are determined using a threshold of overlapping keywords, ranking of the number of overlapping keywords or a combination thereof.

Such a provisioning engine 126 advantageously uses a named entity recognition model to identify keywords from job descriptions, then use keywords to filter for similar employees and their associated platforms. Such a provisioning system advantageously uses suggested similar employee(s) to identify user personas of the new user, then uses personas to filter for similar employees and their associated platforms.

Figure 2:
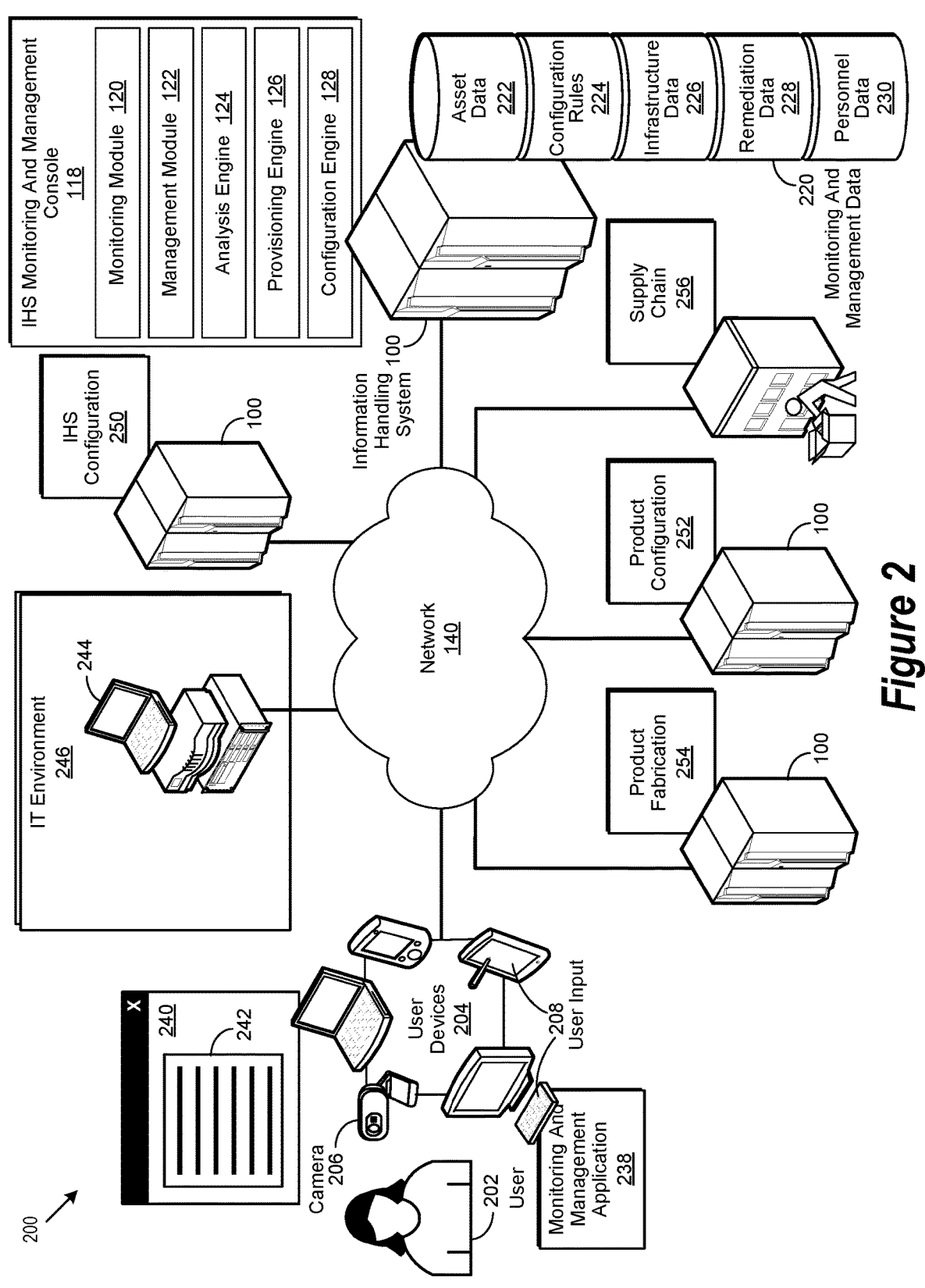
FIG. 2 shows a block diagram of an information handling system monitoring and management environment.

FIG. 2 is a simplified block diagram of an IT system monitoring and management environment 200 implemented in accordance with an embodiment of the invention. In various embodiments, the information handling system may be included within a data center or within an IT environment 246. As used herein, a data center broadly refers to a building, a dedicated space within a building, or a group of buildings, used to house a collection of interrelated information handling assets 244 implemented to work in combination with one another for a particular purpose. As likewise used herein, an IT asset 244 broadly refers to anything tangible, or intangible, that can be owned, controlled, or enabled to produce value as a result of its use. As used herein, an IT environment broadly refers to a collection of IT assets 244 associated with a particular organization where the collection of information handling assets 244 are implemented further a purpose of the particular organization. In certain embodiments, an IT asset 244 may include a product, or a service, or a combination of the two.

As used herein, a tangible IT asset 244 broadly refers to IT asset 244 having a physical substance, such as a computing or network device. Examples of computing devices may include personal computers (PCs), laptop PCs, tablet computers, servers, mainframe computers, Redundant Arrays of Independent Disks (RAID) storage units, their associated internal and external components, and so forth. Likewise, examples of network devices may include routers, switches, hubs, repeaters, bridges, gateways, and so forth. Other examples of a tangible IT asset 244 may include certain IT personnel, such as an IT system administrator, operator, or technician, and so forth. Other examples of a tangible IT asset 244 may include certain maintenance, repair, and operations (MRO) items, such as replacement and upgrade parts for a particular IT asset 244. In certain embodiments, such MRO items may be in the form of consumables, such as air filters, fuses, fasteners, and so forth.

As likewise used herein, an intangible information handling system component broadly refers to an information handling system component that lacks physical substance. Examples of intangible information handling system components may include software applications, software services, firmware code, and other non-physical, computer-based assets. Other examples of intangible information handling system components may include digital assets, such as structured and unstructured data of all kinds, still images, video images, audio recordings of speech, and other sounds, and so forth. Further examples of intangible information handling system components may include intellectual property, such as patents, trademarks, copyrights, trade names, franchises, goodwill, and knowledge resources, such as information handling system documentation. Yet other examples of intangible information handing system components may include certain tasks, functions, operations, procedures, or processes performed by IT personnel. Those of skill in the art will recognize that many such examples of tangible information handling systems and intangible information handling system components are possible. Accordingly, the foregoing is not intended to limit the spirit, scope or intent of the invention.

In certain embodiments, the value produced by an IT asset 244 may be tangible or intangible. As used herein, tangible value broadly refers to value that can be measured. Examples of tangible value may include return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, and market perception. Skilled practitioners of the art will recognize that many such examples of tangible and intangible value are possible. Accordingly, the foregoing is not intended to limit the spirit, scope or intent of the invention.

In certain embodiments, the IT system monitoring and management environment 200 may include an IT system monitoring and management console 118. In certain embodiments, the IT system monitoring and management console 118 may be implemented to perform an IT system monitoring and management operation. As used herein, an IT system monitoring and management operation broadly refers to any task, function, procedure, or process performed, directly or indirectly, within an IT system monitoring and management environment 200 to procure, deploy, configure, implement, operate, monitor, manage, maintain, or remediate an IT asset 244.

In certain embodiments, an IT system monitoring and management operation may include an IT system monitoring task. As used herein, an IT system monitoring task broadly refers to any function, operation, procedure, or process performed, directly or indirectly, within an IT system monitoring and management environment 200 to monitor the operational status of a particular IT asset 244. In various embodiments, a particular IT asset 244 may be implemented to generate an alert if its operational status exceeds certain parameters. In these embodiments, the definition of such parameters, and the method by which they may be selected, is a matter of design choice.

For example, an internal cooling fan of an information handling system may begin to fail, which in turn may cause the operational temperature of the information handling system to exceed its rated level. In this example, the information handling system may be implemented to generate an alert, which provides notification of the occurrence of an IT asset issue. As used herein, an IT asset issue broadly refers to an operational situation associated with a particular component of a data monitoring and management environment 200, which if not corrected, may result in negative consequences. In certain embodiments, an IT asset issue may be related to the occurrence, or predicted occurrence, of an anomaly within the IT system monitoring and management environment 200. In certain embodiments, the anomaly may be related to unusual or unexpected behavior of one or more IT assets 244.

In certain embodiments, an IT system monitoring and management operation may include an IT asset management task. As used herein, an IT asset management task broadly refers to any function, operation, procedure, or process performed, directly or indirectly, within an IT system monitoring and management environment 200 to manage a particular IT asset 244. In certain embodiments, an IT asset management task may include an IT asset deployment operation, an IT asset remediation operation, an IT asset remediation documentation operation, or a combination thereof.

As used herein, an IT asset deployment operation broadly refers to any function, task, procedure, or process performed, directly or indirectly, within an IT system monitoring and management environment 200 to install a software file, such as a configuration file, a new software application, a version of an operating system, and so forth, on an IT asset 244. As likewise used herein, an IT asset remediation operation broadly refers to any function, task, procedure, or process performed, directly or indirectly, within an IT system monitoring and management environment 200 to correct an operational situation associated with a component of a IT system monitoring and management environment 200, which if not corrected, may result in negative consequences. An IT asset remediation documentation operation, as likewise used herein, broadly refers to any function, task, procedure, or process performed, directly or indirectly, within an IT system monitoring and management environment 200 to retrieve, generate, revise, update, or store remediation documentation that may be used in the performance of an IT asset remediation operation.

In certain embodiments, the IT system monitoring and management console 118 may be implemented to receive an alert corresponding to a particular IT asset issue. In various embodiments, the IT system monitoring and management console 118 may be implemented to receive certain data associated with the operation of a particular IT asset 244. In certain embodiments, such operational data may be received through the use of telemetry approaches familiar to those of skill in the art. In various embodiments, the IT system monitoring console 118 may be implemented to process certain operational data received from a particular IT asset to determine whether an IT asset issue has occurred, is occurring, or is anticipated to occur.

In certain embodiments, the IT system monitoring and management console 118 may be implemented to include a monitoring module 120, a management monitor 122, an analysis engine 124, a provisioning engine 126, and a configuration engine 128, or a combination thereof. In certain embodiments, the monitoring module 120 may be implemented to monitor the procurement, deployment, implementation, operation, management, maintenance, or remediation of a particular IT asset 244 at any point in its lifecycle. In certain embodiments, the management module 122 may be implemented to manage the procurement, deployment, implementation, operation, monitoring, maintenance, or remediation of a particular IT asset 244 at any point in its lifecycle.

In certain embodiments, an IT system monitoring and management operation may include an IT asset provisioning operation, an IT asset configuration operation, or a combination of the two, as described in greater detail herein. In various embodiments, the monitoring module 120, the management module 122, the analysis engine 124, the provisioning engine 126, or the configuration engine 128 may be implemented, individually or in combination with one another, to perform an IT asset provisioning operation, an IT asset configuration operation, or a combination of the two, as likewise described in greater detail herein.

In certain embodiments, the IT system monitoring and management environment 200 may include a repository of IT system monitoring and management data 220. In certain embodiments, the repository of IT system monitoring and management data 220 may be local to the information handling system 100 executing the IT system monitoring and management console 118 or may be located remotely. In various embodiments, the repository of IT system monitoring and management data 220 may include certain information associated with IT asset data 220, IT asset configuration rules 224, information handling system infrastructure data 226, information handling system remediation data 228, and information handling system personnel data 230.

As used herein, IT asset data 222 broadly refers to information associated with a particular IT asset 244, such as an information handling system 100, or an associated workload, that can be read, measured, and structured into a usable format. For example, IT asset data 222 associated with a particular information handling system may include the number and type of processors it can support, their speed and architecture, minimum and maximum amounts of memory supported, various storage configurations, the number, type, and speed of input/output channels and ports, and so forth. In various embodiments, the IT asset data 222 may likewise include certain performance and configuration information associated with a particular workload, as described in greater detail herein. In various embodiments, the IT asset data 222 may include certain public or proprietary information related to IT asset 244 configurations associated with a particular workload.

In certain embodiments, the IT asset data 222 may include information associated with IT asset 244 types, quantities, locations, use types, optimization types, workloads, performance, support information, and cost factors, or a combination thereof, as described in greater detail herein. In certain embodiments, the IT asset data 222 may include information associated with IT asset 244 utilization patterns, likewise described in greater detail herein. In certain embodiments, the IT asset data 222 may include information associated with the allocation of certain IT asset resources, described in greater detail herein, to a particular workload.

As likewise used herein, an IT asset configuration rule 224 broadly refers to a rule used to configure a particular IT asset 244. In certain embodiments, one or more IT asset configuration rules 224 may be used to verify that a particular IT asset 244 configuration is the most optimal for an associated location, or workload, or to interact with other IT assets 244, or a combination thereof, as described in greater detail herein. In certain embodiments, the IT asset configuration rule 224 may be used in the performance of an IT asset configuration verification operation, an information handling system remediation operation, or a combination of the two. In certain embodiments, the IT asset configuration verification operation, or the information handling system remediation operation, or both, may be performed by an asset configuration system 250. In certain embodiments, the asset configuration system 250 may be used in combination with the IT system monitoring and management console 118 to perform an IT asset configuration operation, or an information handling system remediation operation, or a combination of the two.

As used herein, information handling system infrastructure 226 data broadly refers to any data associated with an information handling system infrastructure component. As likewise used herein, an information handling system infrastructure component broadly refers to any component of an IT system monitoring and management environment 200 that may be involved, directly or indirectly, in the procurement, deployment, implementation, configuration, operation, monitoring, management, maintenance, or remediation of a particular IT asset 244. In certain embodiments, information handling system infrastructure components may include physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, physical security systems and associated peripherals, and so forth. In various embodiments, information handling system infrastructure components may likewise include the provision of certain services, such as network connectivity, conditioned airflow, electrical power, and water, or a combination thereof.

Information handling system remediation data 228, as used herein, broadly refers to any data associated with the performance of an information handling system remediation operation, described in greater details herein. In certain embodiments, the information handling system remediation data 228 may include information associated with the remediation of a particular information handling system issue, such as the date and time an alert was received indicating the occurrence of the information handling system issue. In certain embodiments, the information handling system remediation data 228 may likewise include the amount of elapsed time before a corresponding information handling system remediation operation was begun after receiving the alert, and the amount of elapsed time before it was completed. In various embodiments, the information handling system remediation data 228 may include information related to certain information handling system issues, the frequency of their occurrence, their respective causes, error codes associated with such information handling system issues, the respective location of each IT asset 244 associated with such information handling system issues, and so forth.

In various embodiments, the information handling system remediation data 228 may include information associated with IT asset 244 replacement parts, or upgrades, or certain third party services that may need to be procured in order to perform the information handling system remediation operation. Likewise, in certain embodiments, related information handling system remediation data 228 may include the amount of elapsed time before the replacement parts, or IT asset 244 upgrades, or third party services were received and implemented. In certain embodiments, the information handling system remediation data 228 may include information associated with information handling system personnel who may have performed a particular information handling system remediation operation. Likewise, in certain embodiments, related information handling system remediation data 228 may include the amount of time the information handling system personnel actually spent performing the operation, issues encountered in performing the operation, and the eventual outcome of the operation that was performed.

In certain embodiments, the information handling system remediation data 228 may include remediation documentation associated with a particular IT asset 244. In various embodiments, such remediation documentation may include information associated with certain attributes, features, characteristics, functional capabilities, operational parameters, and so forth, of a particular IT asset 244. In certain embodiments, such remediation documentation may likewise include information, such as step-by-step procedures and associated instructions, video tutorials, diagnostic routines and tests, checklists, and so forth, associated with remediating a particular information handling system issue.

In certain embodiments, the information handling system remediation data 228 may include information associated with any related remediation dependencies, such as other information handling system remediation operations that may need to be performed beforehand. In certain embodiments, the information handling system remediation data 228 may include certain time restrictions when an information handling system remediation operation, such as rebooting a particular information handling system, may be performed. In various embodiments, the information handling system remediation data 228 may likewise include certain autonomous remediation rules, described in greater detail herein. In various embodiments, certain of these autonomous remediation rules may be used in the performance of an autonomous remediation operation, described in greater detail herein. Those of skill in the art will recognize that many such examples of information handling system remediation data 228 are possible. Accordingly, the foregoing is not intended to limit the spirit, scope, or intent of the invention.

Information handling system personnel data 230, as used herein, broadly refers to any data associated with information handling system personnel who may be directly, or indirectly, involved in the procurement, deployment, configuration, implementation, operation, monitoring, management, maintenance, or remediation of a particular IT asset 244. In various embodiments, the information handling system personnel data 230 may include job title, work assignment, or responsibility information corresponding to certain information handling system personnel. In various embodiments, the information handling system personnel data 230 may include information related to the type, and number, of information handling system remediation operations currently being, or previously, performed by certain information handling system personnel. In various embodiments, the information handling system personnel data 230 may include historical information, such as success metrics, associated with information handling system remediation operations performed by certain information handling system personnel, such as information handling system administrators, operators, and technicians. In these embodiments, the information handling system personnel data 230 may be updated as individual information handling system personnel complete each information handling system remediation task, described in greater detail herein, they are assigned.

In various embodiments, the information handling system personnel data 230 may likewise include education, certification, and skill level information corresponding to certain information handling system personnel. Likewise, in various embodiments, the information handling system personnel data 230 may include security-related information, such as security clearances, user IDs, passwords, security-related biometrics, authorizations, and so forth, corresponding to certain information handling system personnel. Those of skill in the art will recognize that many such examples of information handling system personnel data 230 are possible. Accordingly, the foregoing is not intended to limit the spirit, scope, or intent of the invention.

In certain embodiments, various IT assets 244 within an IT system monitoring and management environment 200 may have certain interdependencies. As an example, an IT system monitoring and management environment 200 may have multiple information handling systems interconnected by a storage area network (SAN) providing block-level access to various disk arrays and tape libraries. In this example, the information handling systems, various physical and operational elements of the SAN, as well the disk arrays and tape libraries, are interdependent upon one another.

In certain embodiments, each IT asset 244 in an IT system monitoring and management environment 200 may be treated as a separate IT asset 244 and depreciated individually according to their respective attributes. As an example, a particular rack of information handling systems in an IT system monitoring and management environment 200 may be made up of a variety of individual information handling systems, each of which may have a different depreciation schedule. To continue the example, certain of these IT assets 244 may be implemented in different combinations to produce an end result. To further illustrate the example, a particular information handling system in the rack of information handling systems may initially be implemented to query a database of customer records. As another example, the same information handling system may be implemented at a later time to perform an analysis of sales associated with those same customer records.

In certain embodiments, each IT asset 244 in an IT system monitoring and management environment 200 may have an associated maintenance schedule and service contract. For example, an IT system monitoring and management environment 200 may include a wide variety of information handling systems and storage arrays, which may respectively be manufactured by a variety of manufacturers. In this example, the frequency and nature of scheduled maintenance, as well as service contract terms and conditions, may be different for each information handling system and storage array. In certain embodiments, the individual IT assets 244 in an IT system monitoring and management environment 200 may be configured differently, according to their intended use. To continue the previous example, various information handling systems may be configured with faster or additional processors for one intended workload, while other information handling systems may be configured with additional memory for other intended workloads. Likewise, certain storage arrays may be configured as one RAID configuration, while others may be configured as a different RAID configuration.

In certain embodiments, the IT system monitoring and management environment 200 may likewise be implemented to include an asset configuration system 250, a product configuration system 252, a product fabrication system 254, and a supply chain system 256, or a combination thereof. In various embodiments, the asset configuration system 250 may be implemented to perform certain IT asset 244 configuration operations. In certain embodiments, the IT asset 244 configuration operation may be performed to configure a particular IT asset 244 for a particular purpose. In certain embodiments, the IT system monitoring and management console 118 may be implemented to interact with the asset configuration system 250 to perform a particular IT asset 244 configuration operation. In various embodiments, the asset configuration system 250 may be implemented to generate, manage, and provide, or some combination thereof, IT asset configuration rules 224. In certain of these embodiments, the IT asset configuration rules 224 may be used to configure a particular IT asset 244 for a particular purpose.

In certain embodiments, a user 202 may use a user device 204 to interact with the IT system monitoring and management console 118. As used herein, a user device 204 refers to an information handling system such as a personal computer, a laptop computer, a tablet computer, a personal digital assistant (PDA), a smart phone, a mobile telephone, or other device that is capable of processing and communicating data. In certain embodiments, the communication of the data may take place in real-time or near-real-time. As used herein, real-time broadly refers to processing and providing information within a time interval brief enough to not be discernable by a user 202.

In certain embodiments, a user device 204 may be implemented with a camera 206, such as a video camera known to skilled practitioners of the art. In certain embodiments, the camera 206 may be integrated into the user device 204. In certain embodiments, the camera 206 may be implemented as a separate device configured to interoperate with the user device 204. As an example, a webcam familiar to those of skill in the art may be implemented receive and communicate various image and audio signals to a user device 204 via a Universal Serial Bus (USB) interface. In certain embodiments, the user device 204 may be configured to present an IT system monitoring and management console user interface (UI) 240. In certain embodiments, the IT system monitoring and management console UI 240 may be implemented to present a graphical representation 242 of IT asset monitoring and management information, which is automatically generated in response to interaction with the IT system monitoring and management console 118.

In certain embodiments, an IT system monitoring and management application 238 may be implemented on a particular user device 204. In various embodiments, the IT system monitoring and management application 238 may be implemented on a mobile user device 204, such as a laptop computer, a tablet computer, a smart phone, a dedicated-purpose mobile device, and so forth. In certain of these embodiments, the mobile user device 204 may be used at various locations within the IT system monitoring and management environment 200 by the user 202 when performing an IT system monitoring and management operation, described in greater detail herein.

In various embodiments, the IT system monitoring and management application 238 may be implemented to facilitate a user 202, such as an information handling system administrator, operator, or technician, to perform a particular information handling system remediation operation. In various embodiments, such facilitation may include using the IT system monitoring and management application 238 to receive a notification of an information handling system remediation task, described in greater detail herein, being assigned to the user. In certain embodiments, the IT system monitoring and management console 118 may be implemented to generate the notification of the information handling system remediation task assignment, and assign it to the user, as likewise described in greater detail herein. In certain embodiments, the IT system monitoring and management console 118 may be implemented to generate the information handling system remediation task, and once generated, provide it to the IT system monitoring and management application 238 associated with the assigned user 202.

In certain embodiments, such facilitation may include using the IT system monitoring and management application 238 to receive the information handling system remediation task from the IT system monitoring and management console 118. In various embodiments, such facilitation may include using the IT system monitoring and management application 238 to confirm that the user 202 is at the correct physical location of a particular IT asset 244 associated with a corresponding information handling system issue. In certain of these embodiments, the IT system monitoring and management application 238 may be implemented to include certain Global Positioning System (GPS) capabilities, familiar to those of skill in the art, which may be used to determine the physical location of the user 202 in relation to the physical location of a particular IT asset 244.

In various embodiments, such facilitation may include using the IT system monitoring and management application 238 to ensure the user 202 is aware of, or is provided the location of, or receives, or a combination thereof, certain remediation resources, described in greater detail herein, that may be needed to perform a particular information handling system remediation operation. In various embodiments, such facilitation may include using the IT system monitoring and management application 238 to view certain remediation documentation, or augmented instructions, related to performing a particular information handling system remediation operation. In various embodiments, such facilitation may include using the IT system monitoring and management application 238 to certify that a particular information handling system remediation operation has been performed successfully.

In certain embodiments the UI window 240 may be implemented as a UI window of the IT system monitoring and management application 238. In various embodiments, the IT system monitoring and management application 238 may be implemented to include, in part or in whole, certain functionalities associated with the IT system monitoring and management console 118. In certain embodiments, the IT system monitoring and management application 238 may be implemented to interact in combination with the IT system monitoring and management console 118, and other components of the IT system monitoring and management environment 200, to perform an IT system monitoring and management operation.

In certain embodiments, the user device 204 may be used to exchange information between the user 202 and the IT system monitoring and management console 118, the IT system monitoring and management application 238, the asset configuration system 250, the product configuration system 252, the product fabrication system 254, and the supply chain system 256, or a combination thereof, through the use of a network 140. In various embodiments, the asset configuration system 250 may be implemented to configure a particular IT asset 244 to meet certain performance goals. In various embodiments, the asset configuration system 250 may be implemented to use certain IT system monitoring and management data 220, certain IT asset configuration rules 226 it may generate or manage, or a combination thereof, to perform such configurations.

In various embodiments, the product configuration system 252 may be implemented to use certain IT system monitoring and management data 220 to optimally configure a particular IT asset 244, such as a information handling system, for an intended workload. In various embodiments, the IT system monitoring and management data 220 used by the product configuration system 252 may have been generated as a result of certain IT system monitoring and management operations, described in greater detail herein, being performed by the IT system monitoring and management console 118. In various embodiments, the product configuration system 252 may be implemented to provide certain product configuration information to a product fabrication system 254. In various embodiments, the product fabrication system 254 may be implemented to provide certain product fabrication information to a product fabrication environment (not shown). In certain embodiments, the product fabrication information may be used by the product fabrication environment to fabricate a product, such as an information handling system, to match a particular IT asset 244 configuration.

In various embodiments, the IT system monitoring and management console UI 240 may be presented via a website (not shown). In certain embodiments, the website may be provided by one or more of the IT system monitoring and management console 118, the asset configuration system 250, the product configuration system 252, the product fabrication system 254, or the supply chain system 256. In certain embodiments, the supply chain system 256 may be implemented to manage the provision, fulfillment, or deployment of a particular IT asset 244 produced in the product fabrication environment. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input 208 to a web server.

In certain embodiments, the IT system monitoring and management console 118 may be implemented to interact with the asset configuration system 250, the product configuration system 252, the product fabrication system 254, and the supply chain or fulfillment system 256, or a combination thereof, each of which in turn may be executing on a separate information handling system 100. In certain embodiments, the IT system monitoring and management console 118 may be implemented to interact with the asset configuration system 250, the product configuration system 252, the product fabrication system 254, and the supply chain or fulfillment system 256, or a combination thereof, to perform an IT system monitoring and management operation, as described in greater detail herein.

Figure 3:
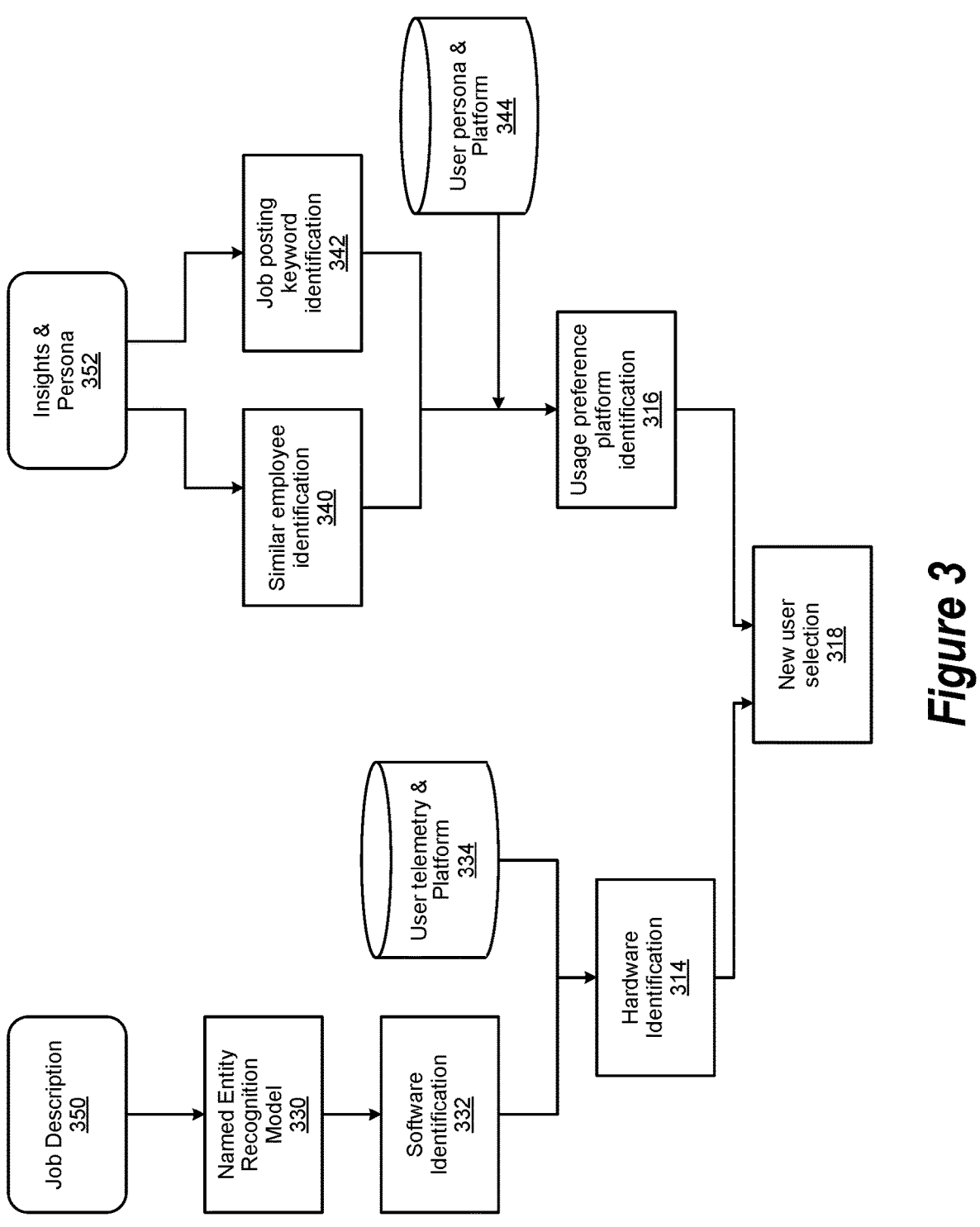
FIG. 3 shows a functional block of a provisioning system for performing certain IT asset provisioning operations.

FIG. 3 shows a functional block of a provisioning environment 300 for performing certain IT asset provisioning operations. In certain embodiments, various aspects of the provisioning environment 300 include the provisioning engine 126, the configuration engine 128 or a combination thereof.

In certain embodiments, the provisioning environment 300 includes a named entity recognition component 310, a similarity determination component 312, a hardware platform identification component 314, a usage preference platform identification component 316 or a combination thereof. In certain embodiments, the hardware platform identification component 314, the usage preference identification component 316, or a combination thereof provide information which is used by a new user selection component 318 to select and configure (i.e., to provision) a platform for a new user.

In certain embodiments, the named entity recognition component 310 includes a named entity recognition model 330, a software identification module 332, a user telemetry and platform repository 334 or a combination thereof. In certain embodiments, the similarity determination component 312 includes a similar employee identification module 340, a job posting keyword identification module 342, a user persona and platform repository 344 or a combination thereof. In certain embodiments, the named entity recognition component 310 receives job description information 350. In certain embodiments, the similarity determination component 312 receives insight and persona information 352.

In various embodiments, the provisioning environment 300 performs a provisioning operation to identify and configure an appropriate information handling system for individuals within a customer organization. In various embodiments, the provisioning environment 300 efficiently selects a new device based on information provided from a plurality of sources. Information obtained from the sources is used to determine the most efficient choice of device for the new hire. In various embodiments, the plurality of sources includes the job description information 350 which is provided to the named entity recognition machine learning model 330. In certain embodiments, the job description information 350 includes information associated with the new hire such as job description information and specific job duty information. In various embodiments, insight and persona information associated with the new hire is provided to the similarity determination component 312.

In various embodiments, the named entity recognition machine learning model 330 identifies and extracts keywords from a job description information associated with the new hire. In various embodiments, the keywords can include one or more of software needed by the job, tasks related to the job, job title information, job team information and job organization information.

In various embodiments, the insight and persona information 352 associated with the new hire can be provided via a hiring manager. In various embodiments, the insight and persona information 352 can be based upon current employees with similar roles. In various embodiments, when the current employees are identified, software used by the current employees can be obtained through IT telemetries retrieved from the IT assets used by the current employees. Additionally, when the current employees are identified, user personas for the current employees can be used to identify a user persona for the new hire. In various embodiments, the user personas can include battery persona information, performance smart tags, application insights, mobility use, and peripheral device usage. In various embodiments, this persona information is also available using a telemetry history of IT assets associated with the current employees.

In various embodiments, when performing the provisioning operation, users with telemetry history are ranked by the number of overlapping personas and then by their current user experience. Platforms with similar user persona and good user experience are added as candidate platforms for provisioning.

In various embodiments, user experience is evaluated by user survey (if available), by experience score calculated from telemetries or by a combination thereof. In various embodiments, if a hiring manager is not available, the keywords extracted from the named entity recognition model 330 are used to identify which previous job postings have similar keywords. The provisioned platforms for particular job postings are added as candidate platforms. Candidate platforms are determined using a threshold of overlapping keywords, ranking of the number of overlapping keywords or a combination thereof.

Such a provisioning environment 300 advantageously uses a named entity recognition model to identify keywords from job descriptions, then uses keywords to filter for similar employees and their associated platforms. Such a provisioning environment 300 advantageously uses suggested similar employee(s) to identify user personas of the new user, then uses personas to filter for similar employees and their associated platforms.

The named entity recognition model identifies keywords from job descriptions, then uses keywords to filter for similar employees and the platforms used by the similar employees. The similar employees are used to identify user personas for the new user. The identified user personas are then used to identify candidate platforms for the new user.

More specifically, the named entity recognition model locates and classifies named entities mentioned in unstructured text into pre-defined categories. As used herein, named entities broadly refers to objects that can be denoted with a proper name. Objects can be abstract or have a physical existence. Software such as "Adobe Photoshop" and job duties such as "circuit verification" are examples of named entities. In certain embodiments, the named entity recognition model is trained to identify named entities that apply to provisioning a system such as software and specific job tasks. In certain embodiments, a labeled corpus containing a collection of authentic text, is used to train the named entity recognition model. In the present case, the corpus includes job descriptions with software and job duties labeled.

An example of a new hire job description to be labeled is:

"Experience with stream-processing systems, such as NiFi/StreamSets, Kafka or Flink."

"Minimum of 6 years of experience in data engineering, data modeling, ETL development, or data warehousing."

An example labeled result generated by the named entity recognition model would be:

"Experience with [stream-processing] task systems, such as [NiFi] software/[StreamSets] software, [Kafka] software or [Flink] software."

"Minimum of 6 years of experience in [data engineering] task, [data modeling] task, [ETL development] task, or [data warehousing] task."

In certain embodiments, the labels are saved as an array for further query.

FIG. 4 shows an example array of persona vs recommended system options. More specifically, in certain embodiments, the personas can include a business professional persona, an outside sales (customer facing) persona, an executive persona, a graphics design, CAD development, product engineering development persona, a mobile workstation persona, a desk-based business professional persona, a desk-based development & technical engineering persona, or a combination thereof. It will be appreciated that a particular user may have more than one associated persona. When identifying a present user to use when provisioning an IT asset for a new hire, the present user having the most overlapping personas is selected as a starting point for provisioning the IT asset for the new hire.

In certain embodiments, the recommended IT assets can include a travel notebook IT asset, a premium travel notebook IT asset, an executive notebook IT asset, an engineering workstation IT asset, a mobile workstation IT asset, a standard desktop IT asset, an engineering desktop IT asset, or a combination thereof.

FIG. 5 shows an example array of provisioning aspects considered when performing the IT asset provisioning operation. More specifically, features to be satisfied by the provisioned IT asset include a budget feature, a hardware performance feature, a usage preference feature, or a combination thereof. In certain embodiments, the usage preference feature includes desired installed software. In certain embodiments, when considering how the budget feature affects the decision regarding provisioning the IT asset, a job title for the new hire, a job family for the new hire or a combination thereof are analyzed. When considering how the hardware performance feature affects the decision regarding provisioning the IT asset, any identified software to be executed, job duty of the new hire or a combination thereof are analyzed. When considering how the usage preference feature affects the decision regarding provisioning the IT asset, user telemetry insights, user personas or a combination thereof are analyzed.

Figure 6:
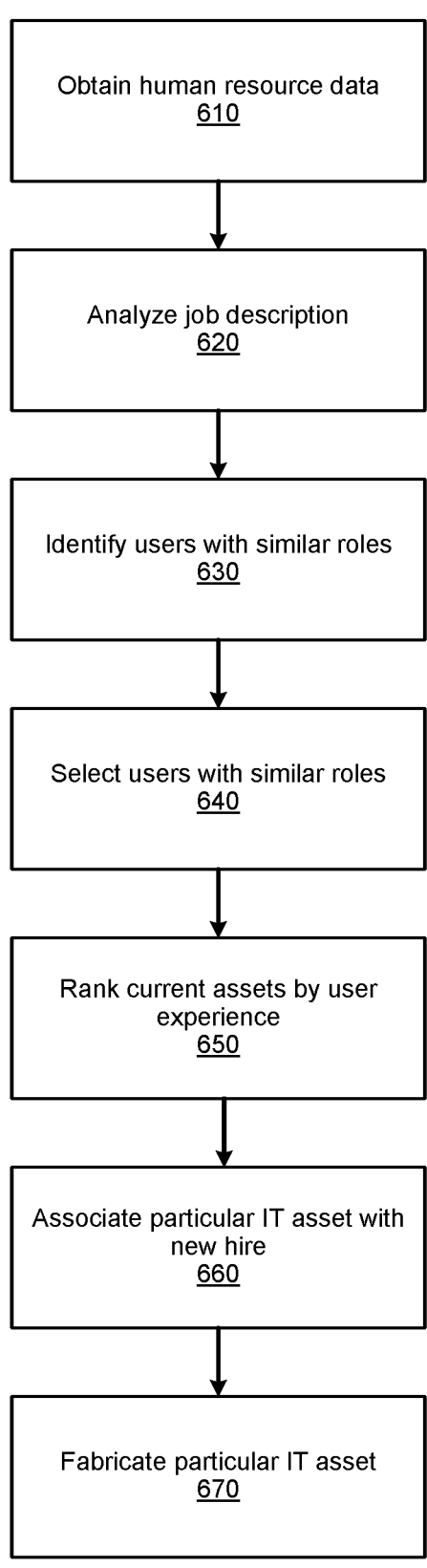

FIG. 6 shows a flow chart of an IT asset provisioning operation 600. More specifically, the IT asset provisioning operation begins at step 610 by obtaining human resource data such as job function, job title and job family. Next, at step 620, a job description of the new hire is analyzed by a named entity recognition model and keywords such as software, specific job duty are extracted from the job description by the model.

Next, at step 630, a request to identify current employees with similar roles is sent to the hiring manager. If the manager is able to identify similar current users then telemetry and persona information related to the current employees is queried to facilitate selection of an IT asset for the new hire. In various embodiments, the telemetry and persona information includes: software usage information, battery persona information, performance smart tag information, application insight information, mobility usage information, peripheral device usage information, or a combination thereof, Next, at step 640, with telemetry insights and personas identified, users with overlapping insights and personas are selected from all users in a database (such as personnel data 230). Current IT assets of the users are ranked by user experience to filter out platforms that failed to meet the users need at step 650. User experience can be determined using user survey information, an experience score which is calculated from user telemetry, or a combination thereof.

Next, at step 660 a particular IT asset having particular hardware characteristics and software is associated with the new hire. Next at step 670, the particular IT asset is fabricated to include the particular hardware characteristics and the particular software is installed on the IT particular IT asset.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing an information technology (IT) system monitoring and management operation, comprising:

identifying IT asset data from a plurality of IT asset data sources contained within an IT environment, the IT environment comprising a collection of IT assets associated with a particular organization, the collection of IT assets being implemented to further a purpose of the particular organization, the collection of IT assets comprising a tangible IT asset, the tangible IT asset comprising a computing device;

extracting information from the IT asset data, the information being extracted via a named entity recognition model, the named entity recognition model identifying and extracting keywords from job description information associated with a new user;

the new user has an associated persona, the associated persona describing an archetype representing a group of users, the archetype representing the group of users providing a model of which a group of users of a same type are representations;

analyzing the information extracted from the IT asset data;

provisioning an IT asset for the new user based upon the analyzing and the associated persona of the user;

identifying a user within the IT environment functioning in a role similar to a role to be performed by the new user; and wherein the user has a plurality of associated personas; and, the identifying the user within the IT environment functioning in the role similar to the role to be performed by the new user is based upon identifying an overlap of personas of the user and new user.

2. The method of claim 1, wherein:

the new user comprises a new hire to an organization making use of the IT environment.

3. The method of claim 2, wherein:

the asset data comprises job description information associated with the new hire; and, the named entity recognition model extracts keywords from the job description information.

4. The method of claim 1, wherein: the identifying the user within the IT environment functioning in the role similar to the role to be performed by the new user is based upon an associated persona of the user.

5. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for:

identifying IT asset data from a plurality of IT asset data sources contained within an IT environment, the IT environment comprising a collection of IT assets associated with a particular organization, the collection of IT assets being implemented to further a purpose of the particular organization, the collection of IT assets comprising a tangible IT asset, the tangible IT asset comprising a computing device;

extracting information from the IT asset data, the information being extracted via a named entity recognition model, the named entity recognition model identifying and extracting keywords from a job description information associated with a new user;

the new user has an associated persona, the associated persona describing an archetype representing a group of users, the archetype representing the group of users providing a model of which a group of users of a same type are representations;

analyzing the information extracted from the IT asset data;

provisioning an IT asset for the new user based upon the analyzing and the associated persona of the user; and, identifying a user within the IT environment functioning in a role similar to a role to be performed by the new user; and wherein the user has a plurality of associated personas; and, the identifying the user within the IT environment functioning in the role similar to the role to be performed by the new user is based upon identifying an overlap of personas of the user and new user.

6. The system of claim 5, wherein:

the new user comprises a new hire to an organization making use of the IT environment.

7. The system of claim 6, wherein:

the asset data comprises job description information associated with the new hire; and, the named entity recognition model extracts keywords from the job description information.

8. The system of claim 7, wherein: the identifying the user within the IT environment functioning in the role similar to the role to be performed by the new user is based upon an associated persona of the user.

9. A non-transitory, computer-readable storage medium embodying computer program code, the computer program code comprising computer executable instructions configured for:

identifying IT asset data from a plurality of IT asset data sources contained within an IT environment, the IT environment comprising a collection of IT assets associated with a particular organization, the collection of IT assets being implemented to further a purpose of the particular organization, the collection of IT assets comprising a tangible IT asset, the tangible IT asset comprising a computing device;

extracting information from the IT asset data, the information being extracted via a named entity recognition model, the named entity recognition model identifying and extracting keywords from job description information associated with a new user;

the new user has an associated persona, the associated persona describing an archetype representing a group of users, the archetype representing the group of users providing a model of which a group of users of a same type are representations;

analyzing the information extracted from the IT asset data;

provisioning an IT asset for the new user based upon the analyzing and the associated persona of the user;

identifying a user within the IT environment functioning in a role similar to a role to be performed by the new user; and wherein the user has a plurality of associated personas; and, the identifying the user within the IT environment functioning in the role similar to the role to be performed by the new user is based upon identifying an overlap of personas of the user and new user.

10. The non-transitory, computer-readable storage medium of claim 9, wherein:

the new user comprises a new hire to an organization making use of the IT environment.

11. The non-transitory, computer-readable storage medium of claim 10, wherein:

the asset data comprises job description information associated with the new hire; and, the named entity recognition model extracts keywords from the job description information.

12. The non-transitory, computer-readable storage medium of claim 9, wherein: the identifying the user within the IT environment functioning in the role similar to the role to be performed by the new user is based upon an associated persona of the user.

13. The non-transitory, computer-readable storage medium of claim 9, wherein:

the computer executable instructions are deployable to a client system from a server system at a remote location.

14. The non-transitory, computer-readable storage medium of claim 9, wherein:

the computer executable instructions are provided by a service provider to a user on an on-demand basis.

* * * * *